US012043185B2

United States Patent
Yamaoka et al.

(10) Patent No.: US 12,043,185 B2
(45) Date of Patent: Jul. 23, 2024

(54) CAMERA HOLDING STRUCTURE

(71) Applicant: HONDA MOTOR CO., LTD., Tokyo (JP)

(72) Inventors: Hironori Yamaoka, Tokyo (JP); Tadahiro Matori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 17/968,009

(22) Filed: Oct. 18, 2022

(65) Prior Publication Data
US 2023/0158970 A1    May 25, 2023

(30) Foreign Application Priority Data

Nov. 19, 2021   (JP) ................................. 2021-188654

(51) Int. Cl.
| | |
|---|---|
| *B60R 11/04* | (2006.01) |
| *H04N 23/50* | (2023.01) |
| *H04N 23/57* | (2023.01) |
| *B60R 11/00* | (2006.01) |

(52) U.S. Cl.
CPC ............. *B60R 11/04* (2013.01); *H04N 23/50* (2023.01); *H04N 23/57* (2023.01); *B60R 2011/0026* (2013.01)

(58) Field of Classification Search
None
See application file for complete search history.

(56) References Cited

U.S. PATENT DOCUMENTS

| | | | |
|---|---|---|---|
| 10,196,006 B1* | 2/2019 | Warren | ................... B60R 11/04 |
| 10,974,660 B2 | 4/2021 | Masui et al. | |
| 11,065,836 B2 | 7/2021 | Nakagawa | |
| 11,237,461 B2 | 2/2022 | Kasai et al. | |
| 2017/0355408 A1* | 12/2017 | Levy | ......................... B60J 1/005 |
| 2019/0283549 A1 | 9/2019 | Oya et al. | |
| 2019/0344662 A1* | 11/2019 | Warren | ................. B60K 35/00 |
| 2020/0017037 A1* | 1/2020 | Masui | .................... H04N 23/55 |

(Continued)

FOREIGN PATENT DOCUMENTS

| | | | |
|---|---|---|---|
| DE | 102014224860 A1 * | 6/2016 | |
| JP | 2017030469 A | 2/2017 | |

(Continued)

OTHER PUBLICATIONS

Notice of Reasons for Refusal for Japanese Patent Application No. 2021-188654; 11 pp.

*Primary Examiner* — Rodney E Fuller
(74) *Attorney, Agent, or Firm* — Armstrong Teasdale LLP (57) ABSTRACT

A camera holding structure for holding a vehicle-mounted camera includes: a window separating a vehicle interior space from a vehicle exterior space; and a holding member fixed to an inner surface of the window and holding the vehicle-mounted camera. The holding member includes a fixing frame that is fixed to the inner surface of the window and a hood that protrudes from the fixing frame toward an inside of a vehicle and defines a field-of-view space of the vehicle-mounted camera on a vehicle inner side of the window. The fixing frame has an opposing surface that opposes the inner surface of the window and is attached to the inner surface of the window, the opposing surface being provided with at least one marking part that is visible from outside the vehicle.

10 Claims, 6 Drawing Sheets

(56) References Cited

U.S. PATENT DOCUMENTS

2020/0191620 A1    6/2020  Yoshii et al.
2021/0146853 A1    5/2021  Mutyala et al.

FOREIGN PATENT DOCUMENTS

| | | |
|---|---|---|
| JP | 2020008814 A | 1/2020 |
| JP | 2020097331 A | 6/2020 |
| JP | 2020098282 A | 6/2020 |
| JP | 2021172155 A | 11/2021 |
| WO | WO-2018178883 A1 * 10/2018 | ....... B32B 17/10036 |
| WO | WO-2019038723 A1 * 2/2019 | ....... B32B 17/10036 |
| WO | WO-2021220206 A1 * 11/2021 | ....... B32B 17/10036 |

* cited by examiner

CAMERA HOLDING STRUCTURE

TECHNICAL FIELD

The present invention relates to a camera holding structure for holding a vehicle-mounted camera.

BACKGROUND ART

Conventionally, a camera holding structure for holding a vehicle-mounted camera is known. For example, the camera holding structure includes a window separating a vehicle interior space from a vehicle exterior space and a holding member fixed to the inner surface of the window and holding the vehicle-mounted camera.

For example, JP2020-98282A discloses a camera bracket that fixes an external environment detection camera to the inner surface of the front window glass.

In a case where the holding member as described above is attached to an inner surface of the window by means of an adhesive or the like, if the attachment position of the holding member on the inner surface of the window deviates from the target position, the positional accuracy of the holding member relative to the window decreases, and the positional accuracy of the vehicle-mounted camera held by the holding member also may decrease.

SUMMARY OF THE INVENTION

In view of the foregoing background, a primary object of the present invention is to provide a camera holding structure which can facilitate accurately attaching the holding member on the inner surface of the window at the target position.

To achieve the above object, one aspect of the present invention provides a camera holding structure (17) for holding a vehicle-mounted camera (11), comprising: a window (6) separating a vehicle interior space (SP1) from a vehicle exterior space (SP2); and a holding member (16) fixed to an inner surface (6A) of the window and holding the vehicle-mounted camera, wherein the holding member includes a fixing frame (19) that is fixed to the inner surface of the window and a hood (20) that protrudes from the fixing frame toward an inside of a vehicle and defines a field-of-view space (S) of the vehicle-mounted camera on a vehicle inner side of the window, and the fixing frame has an opposing surface (41) that opposes the inner surface of the window and is attached to the inner surface of the window, the opposing surface being provided with at least one marking part (47, 51, 61, 71) that is visible from outside the vehicle.

According to this aspect, it is possible to attach the opposing surface of the fixing frame of the holding member to the inner surface of the window while visually checking the position of the marking part, and therefore, it is possible to prevent the attachment position of the holding member on the inner surface of the window from deviating from the target position. Accordingly, it is possible to improve the positional accuracy of the holding member and the vehicle-mounted camera relative to the window.

Preferably, the field-of-view space is provided on a rear side of the window, the hood includes left and right side wall portions (26) respectively defining left and right side portions of the field-of-view space and a bottom wall portion (27) connecting lower end portions of the left and right side wall portions and defining a lower portion of the field-of-view space, an upper surface of the bottom wall portion is provided with a stray light suppressing structure (30) for suppressing stray light entering the vehicle-mounted camera, the stray light suppressing structure having multiple ridges (31) arranged in a front-rear direction and extending in a left-right direction, and the at least one marking part extends in the left-right direction at a position on a lower front side of the multiple ridges.

According to this aspect, uniformity of design of the stray light suppressing structure and the opposing surface can be enhanced, whereby the appearance of the vehicle can be improved.

Preferably, the at least one marking part includes multiple marking parts arranged at intervals in a direction perpendicular to the left-right direction, and a pitch of the multiple marking parts is same as a pitch of the multiple ridges.

According to this aspect, uniformity of design of the stray light suppressing structure and the opposing surface can be further enhanced, whereby the appearance of the vehicle can be further improved.

Preferably, the window includes a base material layer (8) having transparency and a light shielding layer (9) superposed on a part of the base material layer and having transparency lower than that of the base material layer, the light shielding layer being provided with an opening (10) for allowing light entering the field-of-view space to pass therethrough, the opposing surface includes a covered part (43) covered by the light shielding layer as seen from outside the vehicle and an exposed part (44) provided in a position corresponding to the opening and exposed from the light shielding layer as seen from outside the vehicle, and at least a part of the at least one marking part is provided on the exposed part.

According to this aspect, it is possible to attach the opposing surface to the inner surface of the window while visually checking the position of the marking part relative to the opening of the light shielding layer. Therefore, it is possible to more effectively prevent the attachment position of the holding member on the inner surface of the window from deviating from the target position.

Preferably, the exposed part extends in a left-right direction from a left edge to a right edge of the opening, and the at least one marking part is continuous from a left end to a right end of the exposed part.

According to this aspect, the length of the marking part can be secured sufficiently, and therefore, it is easy to visually check the position of the marking part.

In one embodiment, the at least one marking part may include a recess (47, 51) provided on the opposing surface.

According to this aspect, when the holding member undergoes thermal expansion, the recess can absorb the stress due to the thermal expansion of the holding member. Therefore, it is possible to prevent reduction in the attachment strength between the opposing surface and the inner surface of the window due to thermal expansion of the holding member.

In another embodiment, the at least one marking part may include a projection (61) provided on the opposing surface.

According to this aspect, the projection reinforces the fixing frame, thereby enhancing the stiffness of the fixing frame. Therefore, it is possible to suppress deformation of the fixing frame.

In another embodiment, the at least one marking part may include a painted part (71) that is painted with a color different from a color of the opposing surface.

According to this aspect, it is possible to form the marking part without providing irregularities on the opposing surface itself. Therefore, it is possible to avoid complication of the structure of the holding member due to formation of the marking part.

Preferably, the opposing surface is attached to the inner surface of the window via an adhesive having transparency.

According to this aspect, even when the adhesive is provided in a position overlapping with the marking part, it is possible to sufficiently see the position of the marking part from outside the vehicle via the adhesive.

Thus, according to an aspect of the present invention, a camera holding structure which can facilitate accurately attaching the holding member on the inner surface of the window at the target position can be provided.

DETAILED DESCRIPTION OF THE INVENTION (Vehicle 1)

In the following, a vehicle 1 according to one embodiment of the present invention will be described with reference to FIGS. 1 to 3. An arrow Fr included in each drawing indicated the forward direction of the vehicle 1.

Figure 1:
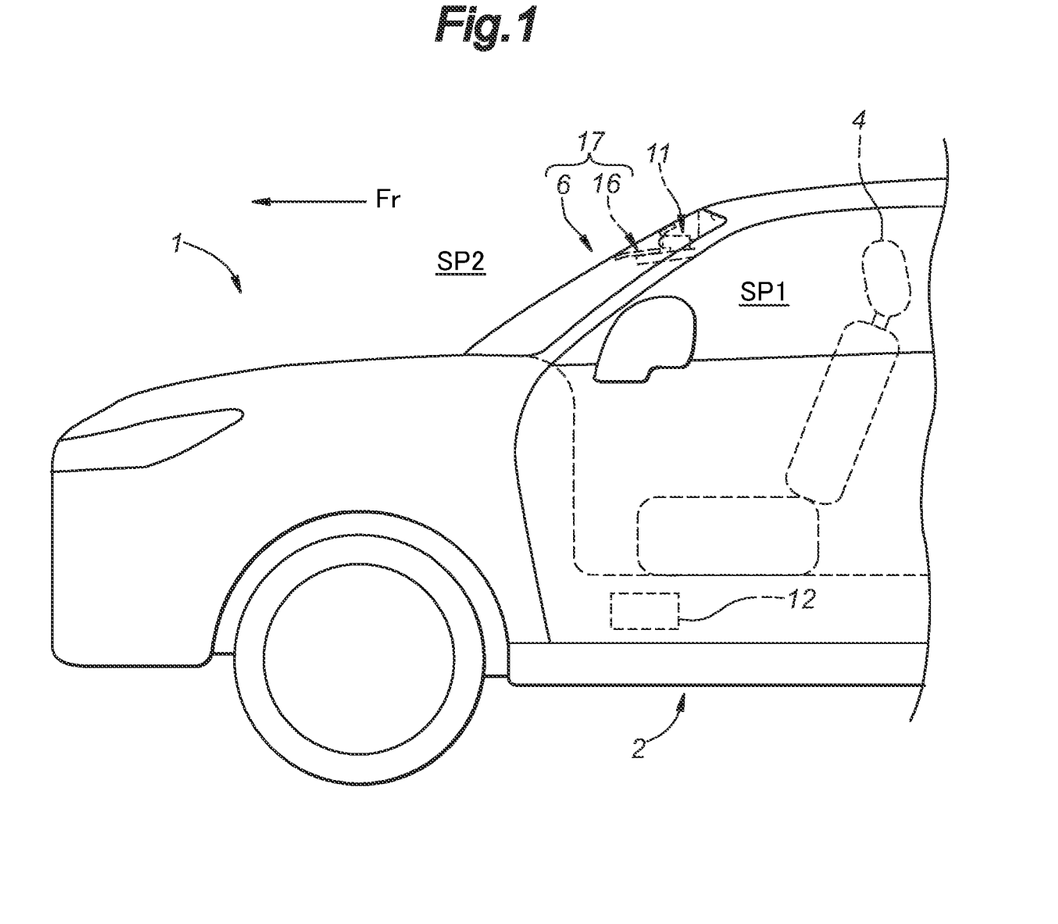
FIG. 1 is a side view showing a front portion of a vehicle according to one embodiment of the present invention.

Referring to FIG. 1, the vehicle 1 is a four-wheeled automobile. The vehicle 1 includes a vehicle body 2 elongated in the front-rear direction. A vehicle interior space SP1 is defined inside the vehicle body 2, and multiple seats 4 are provided in a central part of the vehicle interior space SP1 in the front-rear direction.

In a front portion of the vehicle 1, a front window 6 (an example of a window) is provided in front of the multiple seats 4. The front window 6 separates a vehicle interior space SP1 from a vehicle exterior space SP2 (in the present embodiment, the space in front of the vehicle 1). The front window 6 is inclined rearward toward the above.

Figure 2:
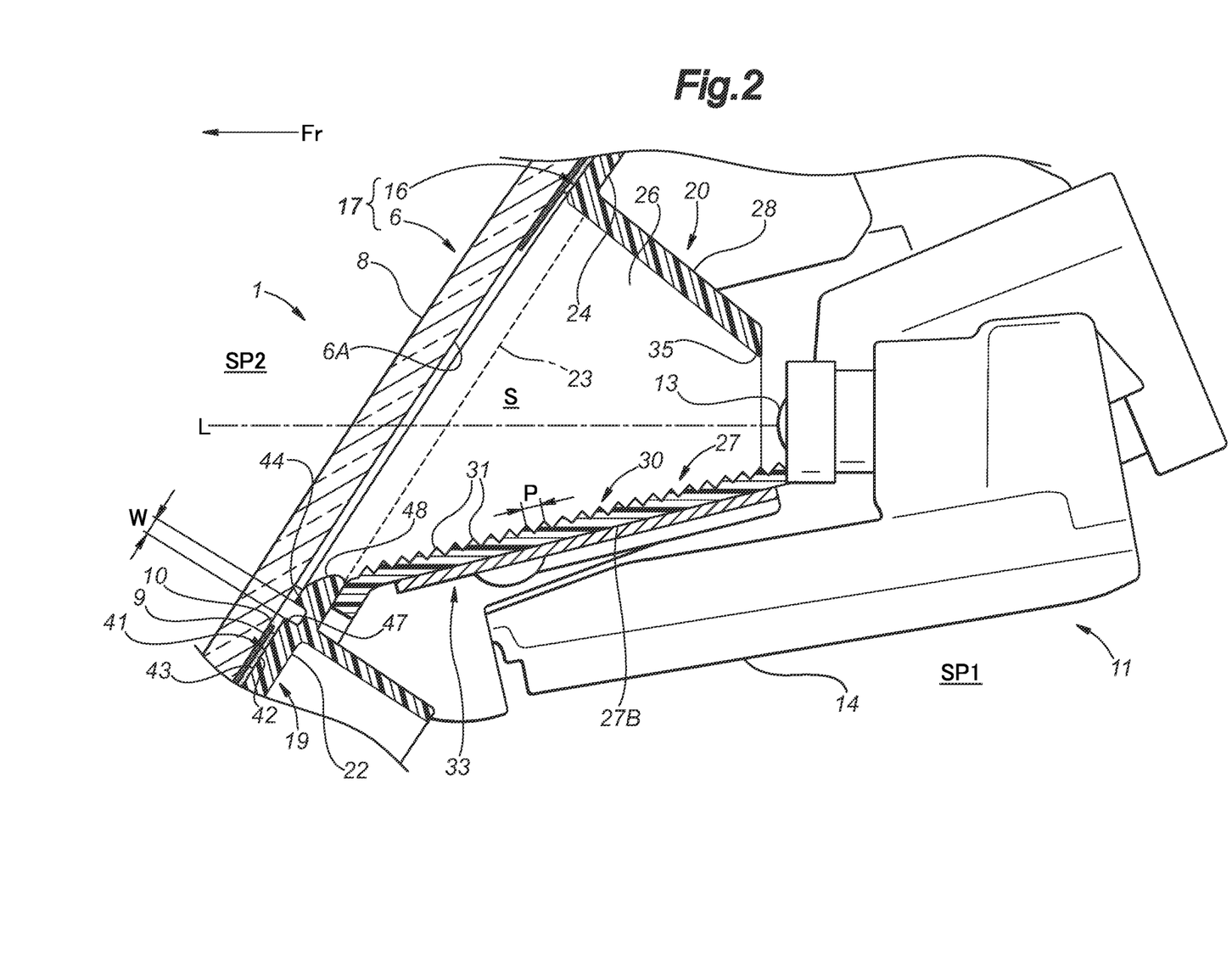
FIG. 2 is a sectional view showing a bracket and its surrounding part according to the embodiment.
Figure 3:
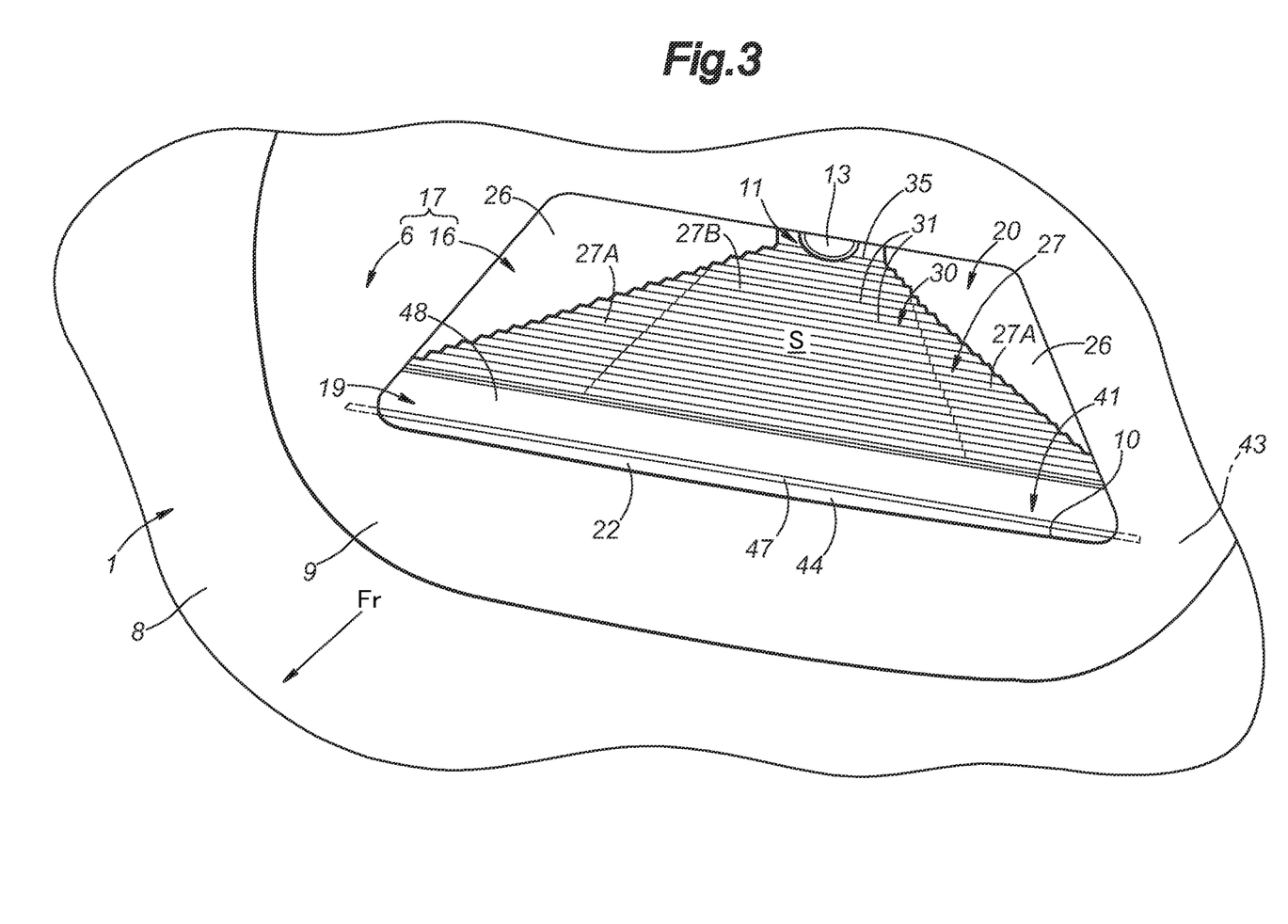
FIG. 3 is a perspective view showing the bracket and its surrounding part according to the embodiment as seen from vehicle outside.

Referring to FIGS. 2 and 3, the front window 6 includes a base material layer 8 and a light shielding layer 9 superposed on a center part of an upper portion of the base material layer 8 from inside the vehicle. The base material layer 8 is made of glass and has transparency. Note that in another embodiment, the base material layer 8 may be made of a material with transparency other than glass (for example, a resin with transparency). The light shielding layer 9 is made of black ceramic printed on the inner surface of the base material layer 8 and does not have transparency. Note that in another embodiment, the light shielding layer 9 may be made of a material with transparency lower than that of the base material layer 8, other than black ceramic. A central part of the light shielding layer 9 is provided with an opening 10 having a substantially trapezoidal shape.

A front camera 11 (an example of a vehicle-mounted camera) is provided behind an upper portion of the front window 6. The front camera 11 is a device to capture images of the vehicle exterior space SP2 from the vehicle interior space SP1 via the front window 6. For example, the front camera 11 is a digital camera using a solid imaging element such as a CCD or a CMOS. The front camera 11 is connected to a control device 12 (see FIG. 1). The control device 12 is configured to execute advanced driver assistance control (for example, lane keeping control and preceding vehicle following control) of the vehicle 1 based on the image data transmitted from the front camera 11. Referring to FIG. 2, the front camera 11 includes a lens 13 that converges the light incident thereon from the front and a camera main body 14 that holds the lens 13. A lower portion of the camera main body 14 extends more forward than an upper portion of the camera main body 14.

Referring to FIGS. 2 and 3, a bracket 16 (an example of a holding member) for holding the front camera 11 is fixed to an inner surface of the base material layer 8 and the light shielding layer 9 of the front window 6 (hereinafter referred to as "the inner surface 6A of the front window 6"). The bracket 16 constitutes a camera holding structure 17 in cooperation with the front window 6.

The bracket 16 includes a fixing frame 19 that is fixed to the inner surface 6A of the front window 6 and a hood 20 that protrudes from the fixing frame 19 toward a rear lower side (inside of the vehicle).

The fixing frame 19 of the bracket 16 is disposed along the inner surface 6A of the front window 6 and is attached to the inner surface 6A of the front window 6. Note that an attachment structure for attaching the fixing frame 19 to the inner surface 6A of the front window 6 will be described later.

The fixing frame 19 is a rectangular frame. The fixing frame 19 includes a front plate part 22 extending in the left-right direction, left and right side plate parts 23 extending from the front plate part 22 rearward and upward (in FIG. 2, only the right side plate part 23 is shown), and a rear plate part 24 extending in the left-right direction to connect rear end portions of the left and right side plate parts 23.

The hood 20 of the bracket 16 defines a field-of-view space S of the front camera 11 (simply referred to as "the field-of-view space S" hereinafter). The field-of-view space S is a space for making the light from the vehicle exterior space SP2 incident on the lens 13 of the front camera 11 and is provided on the rear side (vehicle inner side) of the front window 6. The field-of-view space S is provided in a position corresponding to the opening 10 of the light shielding layer 9 of the front window 6, and the light from the vehicle exterior space SP2 enters the field-of-view space S through the opening 10.

The hood 20 includes left and right side wall portions 26 respectively extending downward from the left and right side plate parts 23 of the fixing frame 19, a bottom wall portion 27 connecting lower end portions of the left and right side wall portions 26, and a rear wall portion 28 extending rearward and downward from the rear plate part 24 of the fixing frame 19 and connecting rear upper end portions of the left and right side wall portions 26.

The left and right side wall portions 26 of the hood 20 define left and right side portions of the field-of-view space S, respectively. The left and right side wall portions 26 are provided integrally with the fixing frame 19. The opposing interval between the left and right side wall portions 26 gradually becomes wider from the rear toward the front.

The bottom wall portion 27 of the hood 20 defines a lower portion of the field-of-view space S. A front portion of the bottom wall portion 27 opposes the front window 6 via an interval in the up-down direction. The opposing interval between the front portion of the bottom wall portion 27 and the front window 6 gradually becomes wider from the front toward the rear. The lower portion of the camera main body 14 of the front camera 11 is mounted to the bottom wall portion 27 via a mounting mechanism (not shown in the drawings).

An upper surface of the bottom wall portion 27 is provided with a stray light suppressing structure 30 (also referred to as a stray light shield (SLS)) for suppressing stray light (reflection light) entering the lens 13 of the front camera 11. For example, the stray light suppressing structure 30 is configured by multiple ridges 31 arranged successively in the front-rear direction. Each ridge 31 extends linearly in the left-right direction from a lower end portion of one of the left and right side wall portions 26 to a lower end portion of the other. Each ridge 31 has an inverted V-shaped cross section, for example.

Left and right side portions 27A of the bottom wall portion 27 are provided integrally with the left and right side wall portions 26. A laterally central portion 27B of the bottom wall portion 27 is detachably fitted between the left and right side portions 27A of the bottom wall portion 27. On the lower surface of the laterally central portion 27B of the bottom wall portion 27, a heater 33 for heating the front window 6 is mounted. The heater 33 is constituted of multiple heating wires (not shown in the drawings). The heater 33 is positioned right above the lower portion of the camera main body 14 of the front camera 11.

The rear wall portion 28 of the hood 20 defines a rear upper portion of the field-of-view space S. The rear wall portion 28 is provided integrally with the fixing frame 19. The rear wall portion 28 opposes the rear portion of the bottom wall portion 27 via an interval in the up-down direction. The opposing interval between the rear wall portion 28 and the rear portion of the bottom wall portion 27 gradually becomes narrower from the front toward the rear. An incident aperture 35 is provided between the rear end portion of the rear wall portion 28 and the rear end portion of the bottom wall portion 27, and the light from the field-of-view space S is incident on the lens 13 of the front camera 11 through the incident aperture 35.

(Attachment Structure of Fixing Frame 19)

Next, an attachment structure for attaching the fixing frame 19 to the inner surface 6A of the front window 6 will be described in detail.

Referring to FIGS. 2 and 3, the fixing frame 19 has an opposing surface 41 that is substantially parallel to the inner surface 6A of the front window 6. Note that in another embodiment, the opposing surface 41 may not be substantially parallel to the inner surface 6A of the front window 6. The opposing surface 41 may be a flat surface or may be partially or wholly curved. The opposing surface 41 is attached to the inner surface 6A of the front window 6 via an adhesive 42. The adhesive 42 is covered by the light shielding layer 9 of the front window 6 as seen from outside the vehicle. In other words, the adhesive 42 is provided in a position that is not visible from outside the vehicle.

The opposing surface 41 of the fixing frame 19 includes a covered part 43 and an exposed part 44. The covered part 43 is configured by an outer surface of a front portion of the front plate part 22, outer surfaces of the left and right side plate parts 23, and an outer surface of the rear plate part 24. The covered part 43 is covered by the light shielding layer 9 of the front window 6 as seen from outside the vehicle. In other words, the covered part 43 is provided in a position that is not visible from outside the vehicle. The exposed part 44 is configured by an outer surface of a rear portion of the front plate part 22. The exposed part 44 is provided in a position corresponding to the opening 10 of the light shielding layer 9 of the front window 6 and is exposed from the light shielding layer 9 as seen from outside the vehicle. In other words, the exposed part 44 is provided in a position that can be seen from outside the vehicle. The exposed part 44 extends in the left-right direction from the left edge to the right edge of the opening 10.

A front portion of the opposing surface 41 of the fixing frame 19 (a portion corresponding to the front plate part 22) is provided with a single recess 47. The recess 47 extends linearly in the left-right direction at a position on a lower front side of the multiple ridges 31 of the stray light suppressing structure 30. The width W of the recess 47 is the same as the pitch P of the multiple ridges 31. However, in another embodiment, the width W of the recess 47 may be wider than the pitch P of the multiple ridges 31 or narrower than the pitch P of the multiple ridges 31.

The laterally central portion of the recess 47 is provided on the exposed part 44 of the opposing surface 41. In other words, the laterally central portion of the recess 47 is provided in a position that can be seen from outside the vehicle. The left and right end portions of the recess 47 both extend to the covered part 43 of the opposing surface 41. In other words, the recess 47 is continuous from the left end to the right end of the exposed part 44. Note that in another embodiment, the entirety of the recess 47 may be contained within the range of the exposed part 44.

The fixing frame 19 is provided with a connection surface 48 that connects the exposed part 44 of the opposing surface 41 with the upper surface of the bottom wall portion 27 of the hood 20 (namely, the surface provided with the stray light suppressing structure 30). The recess 47 is not provided on the connection surface 48. Therefore, the interval between the front end ridge 31 and the recess 47 is wider than the pitch P of the multiple ridges 31.

Advantageous Effects

In the present embodiment, the opposing surface 41 of the fixing frame 19 is provided with the recess 47 in a position visible from outside the vehicle. Thereby, it is possible to attach the opposing surface 41 to the inner surface 6A of the front window 6 while visually checking the position of the recess 47, and therefore, it is possible to prevent the attachment position of the bracket 16 on the inner surface 6A of the front window 6 from deviating from the target position. Accordingly, it is possible to improve the positional accuracy of the bracket 16 and the front camera 11 relative to the front window 6.

Further, the stray light suppressing structure 30 includes the multiple ridges 31 arranged in the front-rear direction and extending in the left-right direction, and the recess 47 extends in the left-right direction at a position on the lower front side of the multiple ridges 31. Accordingly, uniformity of design of the stray light suppressing structure 30 and the opposing surface 41 can be enhanced, whereby the appearance of the vehicle 1 can be improved.

In addition, the opposing surface 41 includes the exposed part 44 provided in a position corresponding to the opening 10 of the light shielding layer 9, and the laterally central portion of the recess 47 is provided on the exposed part 44. Thereby, it is possible to attach the opposing surface 41 to the inner surface 6A of the front window 6 while visually checking the position of the recess 47 relative to the opening 10 of the light shielding layer 9. Therefore, it is possible to more effectively prevent the attachment position of the bracket 16 on the inner surface 6A of the front window 6 from deviating from the target position.

Also, since the recess 47 is provided on the exposed part 44 as described above, uniformity of design of the stray light suppressing structure 30 and the exposed part 44 can be enhanced. Particularly, in the present embodiment, the heater 33 is mounted on the lower surface of the bottom wall portion 27 of the hood 20, and the heater 33 is positioned right above the lower portion of the camera main body 14 of the front camera 11. Due to this relationship, it is difficult to displace the position of the bottom wall portion 27 of the hood 20 downward, and accordingly, the front end portion of the bottom wall portion 27 of the hood 20 is provided at a relatively high position. As a result, the width of the exposed part 44 in the up-down direction becomes large and the exposed part 44 becomes more noticeable from outside the vehicle. Therefore, the effect of enhancing the uniformity of design of the stray light suppressing structure 30 and the exposed part 44 as described above is high.

Also, the exposed part 44 extends in the left-right direction from the left edge to the right edge of the opening 10, and the recess 47 is continuous from the left end to the right end of the exposed part 44. Thereby, the length of the recess 47 can be secured sufficiently, and therefore, it is easy to visually check the position of the recess 47.

Further, the recess 47 can absorb the stress due to thermal expansion of the bracket 16. Therefore, it is possible to prevent reduction in the attachment strength between the opposing surface 41 and the inner surface 6A of the front window 6 due to thermal expansion of the bracket 16. Also, by using the recess 47 as the marking part, the marking part can be formed at relatively low cost.

Modifications

Figure 4:
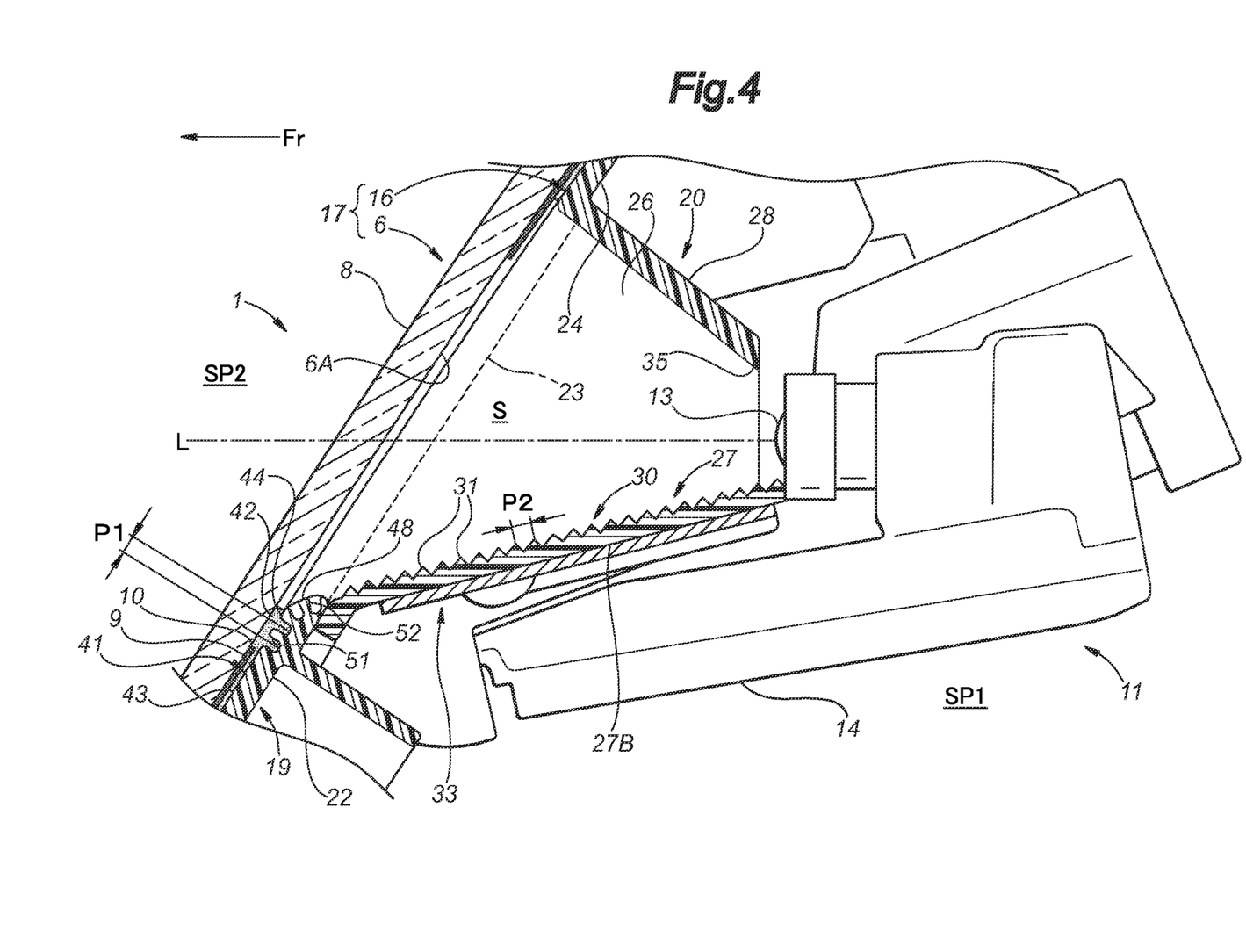
FIG. 4 is a sectional view showing a bracket and its surrounding part according to a first modification of the embodiment.

Referring to FIG. 4, in a first modification of the above embodiment, the exposed part 44 of the opposing surface 41 is provided with multiple recesses 51 (an example of a marking part). The multiple recesses 51 are provided at intervals in a direction perpendicular to the left-right direction. The pitch P1 of the multiple recesses 51 is the same as the pitch P2 of the multiple ridges 31 of the stray light suppressing structure 30. With such a configuration, uniformity of design of the stray light suppressing structure 30 and the opposing surface 41 can be further enhanced, and therefore, the appearance of the vehicle 1 can be further improved.

Further, referring to FIG. 4, in the first modification of the above embodiment, not only the exposed part 44 of the opposing surface 41 is provided with the multiple recesses 51 but also connection surface 48 which connects the exposed part 44 of the opposing surface 41 with the upper surface of the bottom wall portion 27 of the hood 20 is provided with multiple recesses 52. With such a configuration, it is possible to enhance uniformity of design of the stray light suppressing structure 30, the opposing surface 41, and the connection surface 48, whereby the appearance of the vehicle 1 can be improved further.

Also, referring to FIG. 4, in the first modification of the above embodiment, part of the adhesive 42 is exposed from the light shielding layer 9 as seen from outside the vehicle. In other words, part of the adhesive 42 is provided in a position that can be seen from outside the vehicle. In such a case, it is preferred that the adhesive 42 has transparency. Thereby, even when the adhesive 42 is provided in a position overlapping with the multiple recesses 51, it is possible to sufficiently see the multiple recesses 51 from outside the vehicle the adhesive 42. In addition, even if the adhesive 42 is seen from outside the vehicle, the appearance of the vehicle 1 is unlikely to be spoiled, and therefore, management of layout of the adhesive 42 is easy.

Figure 5:
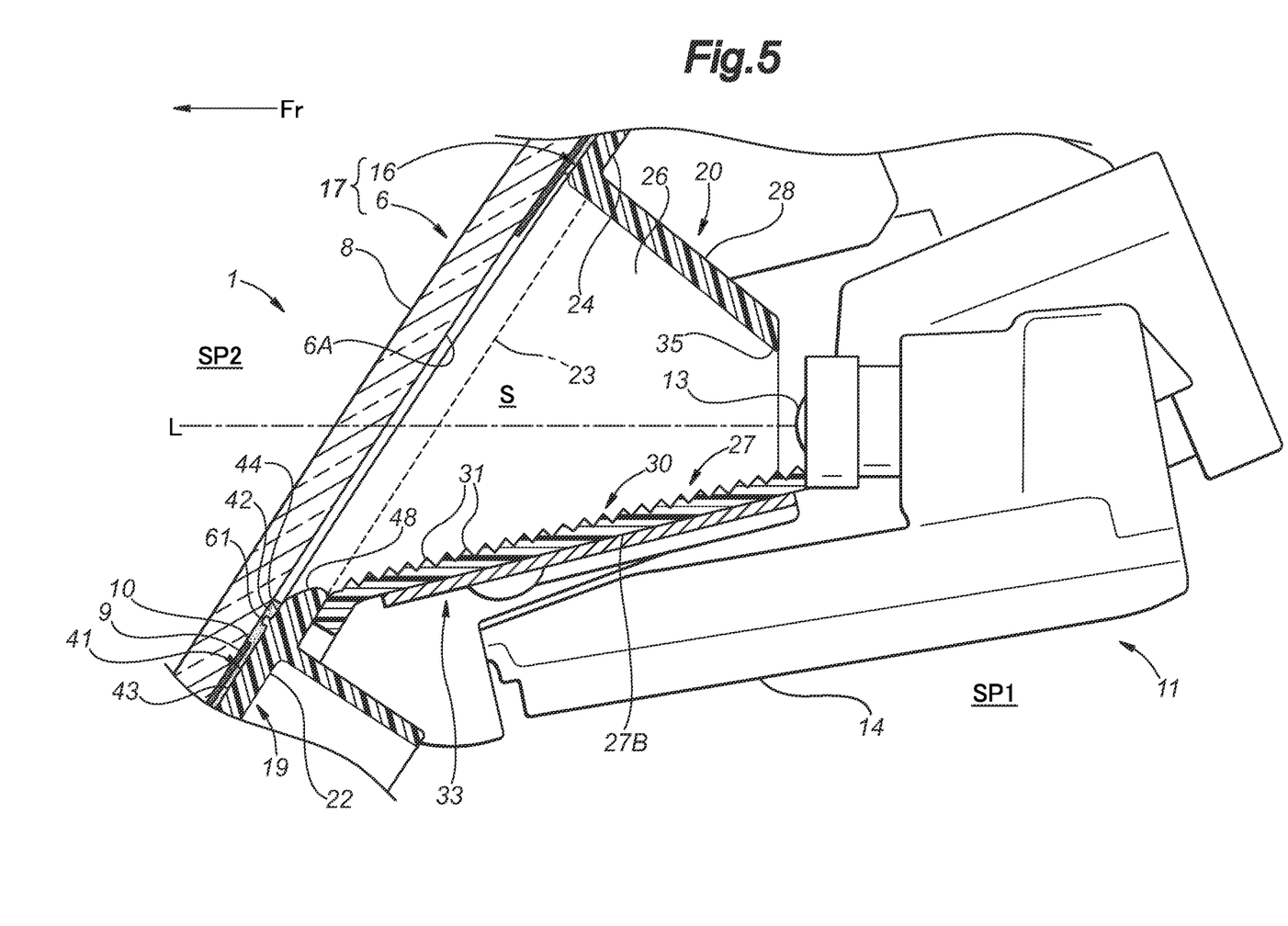
FIG. 5 is a sectional view showing a bracket and its surrounding part according to a second modification of the embodiment.

Referring to FIG. 5, in a second modification of the above embodiment, instead of the recess 47, one or multiple projections 61 (an example of the marking part) are provided on the exposed part 44 of the opposing surface 41. The projection 61 extends in the left-right direction and is continuous from the left end to the right end of the exposed part 44. With such a configuration, the projection 61 can reinforce the fixing frame 19, and therefore, the stiffness of the fixing frame 19 can be enhanced. As a result, deformation of the fixing frame 19 (particularly, flexing of the fixing frame 19 when the temperature of the fixing frame 19 becomes high as in the summer) can be suppressed. Also, it is possible to use, as the material of the bracket 16, an inexpensive resin material having relatively low stiffness, and this can reduce the cost for the material of the bracket 16. Further, by using the projection 61 as the marking part, the marking part can be formed at relatively low cost.

Figure 6:
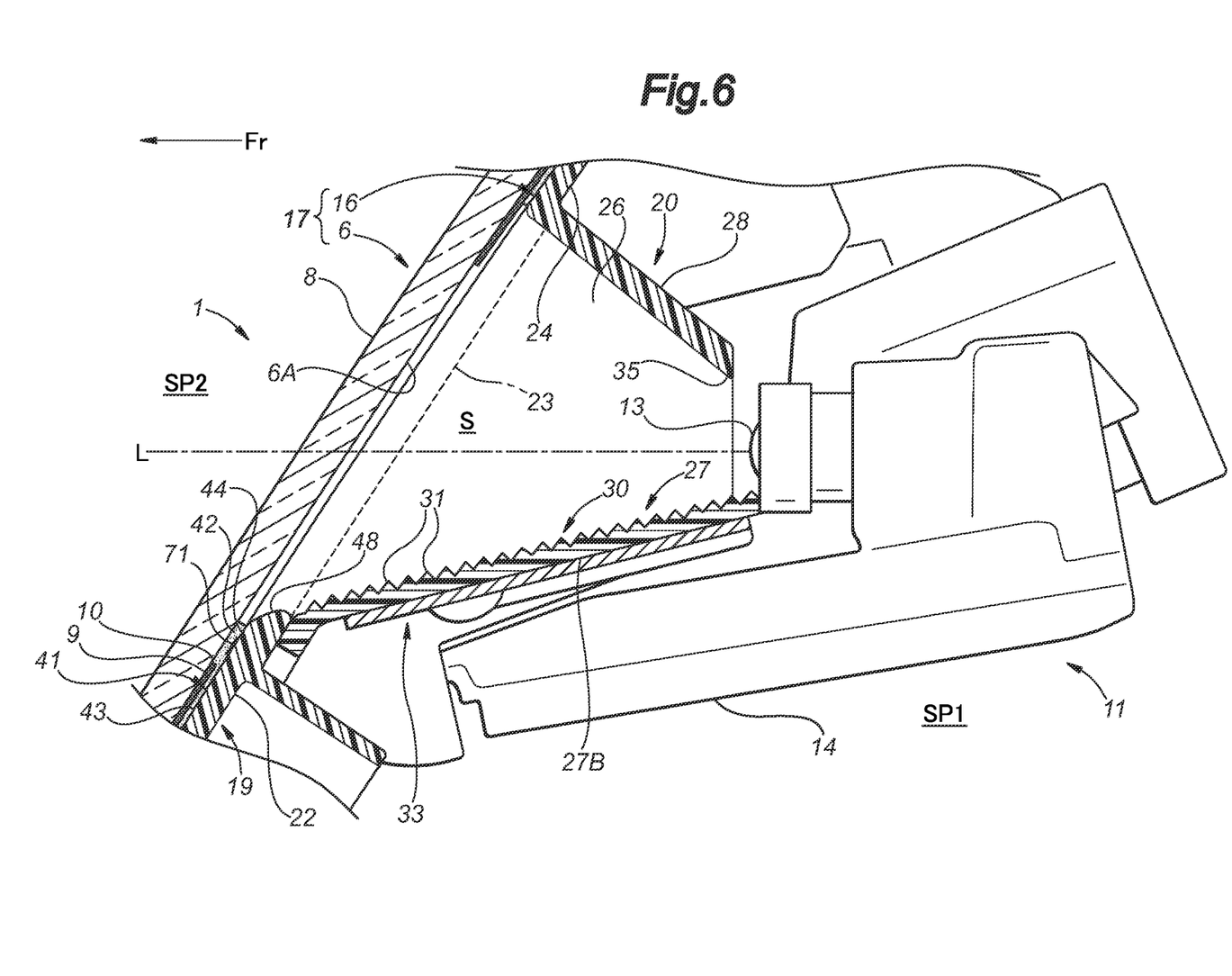
FIG. 6 is a sectional view showing a bracket and its surrounding part according to a third modification of the embodiment.

Referring to FIG. 6, in a third modification of the above embodiment, instead of the recess 47, one or multiple painted parts 71 (an example of the marking part) are provided on the exposed part 44 of the opposing surface 41. The painted part 71 is painted with a color different from the color of the opposing surface 41. The painted part 71 extends in the left-right direction and is continuous from the left end to the right end of the exposed part 44. With such a configuration, it is possible to form the marking part without providing irregularities on the opposing surface 41 itself. Therefore, it is possible to avoid complication of the structure of the bracket 16 due to formation of the marking part. Further, by using the painted part 71 as the marking part, the marking part can be formed at relatively low cost.

In the present embodiment, the front camera 11 was shown as an example of the vehicle-mounted camera but in another embodiment, a rear camera or a side camera (which are not shown in the drawings) can be an example of the vehicle-mounted camera.

Concrete embodiments of the present invention have been described in the foregoing, but the present invention is not limited to the above embodiments and may be modified or altered in various ways.

The invention claimed is:

1. A camera holding structure for holding a vehicle-mounted camera, comprising:
  a window separating a vehicle interior space from a vehicle exterior space; and
  a holding member fixed to an inner surface of the window and holding the vehicle-mounted camera,
  wherein the holding member includes a fixing frame that is fixed to the inner surface of the window and a hood that protrudes from the fixing frame toward an inside of a vehicle and defines a field-of-view space of the vehicle-mounted camera on a vehicle inner side of the window, and
  the fixing frame has an opposing surface that opposes the inner surface of the window and is attached to the inner surface of the window, the opposing surface being provided with at least one marking part that is visible from outside the vehicle,
wherein the field-of-view space is provided on a rear side of the window,
the hood includes left and right side wall portions respectively defining left and right side portions of the field-of-view space and a bottom wall portion connecting lower end portions of the left and right side wall portions and defining a lower portion of the field-of-view space,
an upper surface of the bottom wall portion is provided with a stray light suppressing structure for suppressing stray light entering the vehicle-mounted camera, the stray light suppressing structure having multiple ridges arranged in a front-rear direction and extending in a left-right direction, and
the at least one marking part extends in the left-right direction at a position on a lower front side of the multiple ridges.

2. The camera holding structure according to claim 1, wherein the at least one marking part includes multiple marking parts arranged at intervals in a direction perpendicular to the left-right direction, and
a pitch of the multiple marking parts is same as a pitch of the multiple ridges.

3. The camera holding structure according to claim 1, wherein the window includes a base material layer having transparency and a light shielding layer superposed on a part of the base material layer and having transparency lower than that of the base material layer, the light shielding layer being provided with an opening for allowing light entering the field-of-view space to pass therethrough,
the opposing surface includes a covered part covered by the light shielding layer as seen from outside the vehicle and an exposed part provided in a position corresponding to the opening and exposed from the light shielding layer as seen from outside the vehicle, and
at least a part of the at least one marking part is provided on the exposed part.

4. The camera holding structure according to claim 3, wherein the exposed part extends in the left-right direction from a left edge to a right edge of the opening, and
the at least one marking part is continuous from a left end to a right end of the exposed part.

5. The camera holding structure according to claim 1, wherein the at least one marking part includes a recess provided on the opposing surface.

6. The camera holding structure according to claim 1, wherein the at least one marking part includes a projection provided on the opposing surface.

7. The camera holding structure according to claim 1, wherein the at least one marking part includes a painted part that is painted with a color different from a color of the opposing surface.

8. The camera holding structure according to claim 1, wherein the opposing surface is attached to the inner surface of the window via an adhesive having transparency.

9. The camera holding structure according to claim 1, wherein the at least one marking part consists of a single recess, and
an interval between a frontmost ridge of the multiple ridges and the single recess is wider than a pitch of the multiple ridges.

10. The camera holding structure according to claim 1, wherein the at least one marking part is provided on the opposing surface that is substantially parallel to the inner surface of the window.

* * * * *